United States Patent [19]

Rach et al.

[11] Patent Number: 5,034,079
[45] Date of Patent: Jul. 23, 1991

[54] METHOD AND APPARATUS FOR VULCANIZING PNEUMATIC VEHICLE TIRES

[75] Inventors: Heinz-Dieter Rach, Garbsen; Udo Frerichs, Langenhagen; Hans-Ulrich Klose, Wiedensahl; Carsten Boltze, Barsinghausen, all of Fed. Rep. of Germany

[73] Assignee: Continental Aktiengesellschaft, Hanover, Fed. Rep. of Germany

[21] Appl. No.: 282,942

[22] Filed: Dec. 5, 1988

Related U.S. Application Data

[63] Continuation of Ser. No. 42,516, Apr. 24, 1987, abandoned, which is a continuation of Ser. No. 788,825, Oct. 18, 1985, abandoned.

[30] Foreign Application Priority Data

Oct. 24, 1984 [DE] Fed. Rep. of Germany ....... 3438911

[51] Int. Cl.$^5$ ..................... B29C 35/02; B29D 30/08
[52] U.S. Cl. ................................... 156/135; 156/398; 264/315; 264/326; 425/36; 425/52; 425/58
[58] Field of Search ..................... 425/22–25, 425/27, 36, 39, 40, 42, 44, 48, 52, 58; 264/315, 326, 501, 502; 152/539, 544; 156/130.7, 135, 398

[56] References Cited

U.S. PATENT DOCUMENTS

| | | | |
|---|---|---|---|
| 1,212,457 | 1/1917 | Darrow | 425/58 |
| 1,263,400 | 4/1918 | Frank | 425/58 |
| 1,314,930 | 9/1919 | Baker | 152/544 X |
| 1,314,931 | 9/1919 | Baker | 152/539 X |
| 1,380,537 | 6/1921 | Denman | 425/52 |
| 2,802,239 | 8/1957 | Bosomworth et al. | 264/315 |
| 4,758,401 | 7/1988 | Rach et al. | 264/315 |
| 4,865,532 | 9/1989 | Frerichs et al. | 425/58 |

FOREIGN PATENT DOCUMENTS 3000428 7/1981 Fed. Rep. of Germany.
3246624 6/1984 Fed. Rep. of Germany.

Primary Examiner—Jan H. Silbaugh
Assistant Examiner—Mathieu Vargot
Attorney, Agent, or Firm—Robert W. Becker & Associates

[57] ABSTRACT

A method and apparatus for vulcanizing pneumatic vehicle tires having heads that in the mounted state are disposed on the radially inner periphery of a rim. In order for such tires to achieve a satisfactorily contoured vulcanization, and in order at the same time to produce sealing surfaces with great precision, the tire is vulcanized with its beads in their operating position. During the vulcanization, the radially outwardly disposed surfaces of the tire beads are shaped with the aid of rigid, one-piece, shaped molding rings.

6 Claims, 1 Drawing Sheet

METHOD AND APPARATUS FOR VULCANIZING PNEUMATIC VEHICLE TIRES

This application is a continuation of application Ser. No. 042,516 filed Apr. 24, 1987, now abandoned, which in turn is a continuation of parent case Ser. No. 788,825 filed Oct. 18, 1985, now abandoned.

BACKGROUND OF THE INVENTION

1. Background of the Invention

The present invention relates to a method and apparatus for vulcanizing pneumatic vehicle tires having beads that in the mounted state are disposed on the radially inner periphery of a rim.

2. Description of the Prior Art

The beads of known tires of this type are mounted on rim seating surfaces which are disposed on the radially inner periphery of the rim ring next to the rim flanges, which extend radially inwardly, as shown, for example, in German Offenlegungsschrift 30 00 428 Rach et al dated July 9, 1981. Consequently, the seating surfaces, which provide for an airtight mounting of the tire beads on the rim, are disposed in the radially and axially outer regions of the tire beads, i.e. in the interior of the tire.

With conventional vulcanizing apparatus, externally disposed tire surfaces are shaped by metallic mold parts, against which the tire surfaces are pressed via a bellows-like bag disposed in the interior. However, with a flexible expandable bellows-like bag it is not possible to obtain a satisfactory contour of the aforementioned sealing surfaces.

German Offenlegungsschrift 32 46 624 Frerichs et al dated June 20, 1984 describes an apparatus with which tires of the aforementioned general type can be vulcanized. With this apparatus, however, it is necessary to fold or displace the tire side walls and the beads laterally outwardly for the purpose of vulcanization. A tire vulcanized in this manner can be mounted upon a rim only under stress, whereby the structural stability of the tire suffers during operation.

An object of the present invention for tires of the aforementioned general type is to provide a method and apparatus for vulcanization with which the tire can be vulcanized in such a way that it can subsequently be mounted on a rim without permanent stress or deformation.

BRIEF DESCRIPTION OF THE DRAWING

This object, and other objects and advantages of the present invention, will appear more clearly from the following specification in conjunction with the accompanying drawing, in which.

SUMMARY OF THE INVENTION

Figure 1:
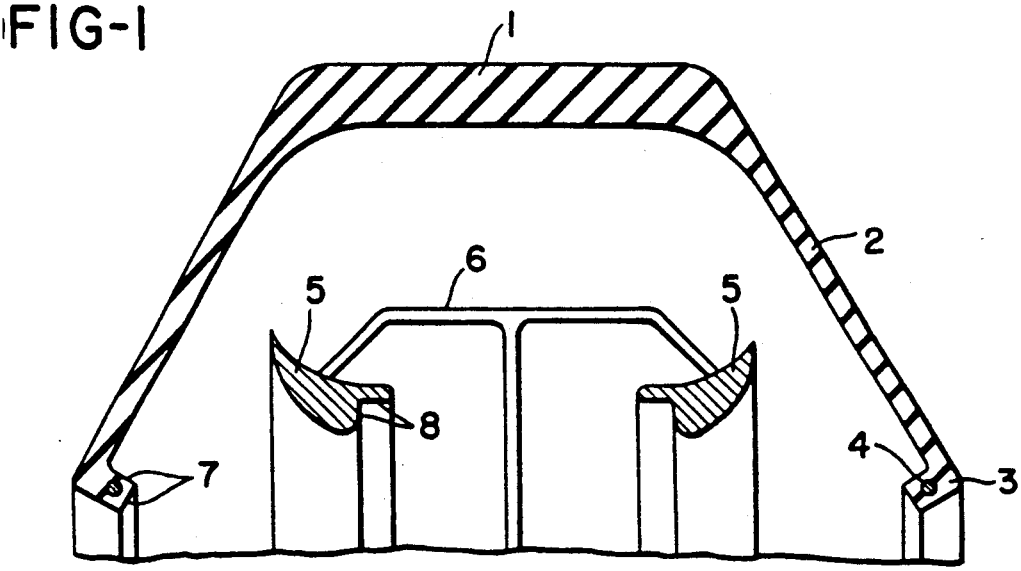
FIG. 1 is a view that shows a partial radial section of a tire blank showing laterally outwardly displaced tire beads, and inserted shaped molding rings.

The present invention is characterized primarily in that the tire is vulcanized with its beads in their operating position, and in that during vulcanization the radially outwardly disposed surfaces of the tire beads are shaped with the aid of rigid, one-piece, crescent-arcuate shaped molding rings with a right angle step recess, as shown in FIG. 1.

By vulcanizing the tire with its beads in their operating position, all detrimental distortions of the tire contour with respect to the subsequent operating position are avoided.

Smooth, satisfactorily contoured sealing surfaces are obtained in the radially and axially outer region of the tire beads with the aid of one-piece steel rings having smooth surfaces. With the aid of a customary expandable bellows-like bag, these rings can be pressed against the inner wall of the tire.

Since the outer diameter of the shaped molding rings is greater than the diameter of the core rings, it is necessary to deform at least one of the tire beads ovally in order to introduce the shaped molding rings into the tire blank. To further improve the introduction, the side walls of the tire blank can be temporarily folded or displaced laterally outwardly.

In order to save energy, it is advantageous to place the shaped molding rings into the tire blank immediately prior to the vulcanization, and after they have been removed from a previously vulcanized tire immediately subsequent to the vulcanization thereof. In this way, the shaped molding rings do not cool off between separate heating periods.

Alternatively, the shaped molding rings can also be placed in the previously described locations already during the wrapping of the tire, thus eliminating a subsequent deformation or distortion of the tire blank, which would have an adverse effect upon the manufacturing tolerances.

DESCRIPTION OF PREFERRED EMBODIMENTS

Referring now to the drawing in detail, the tire blank or unfinished tire is built-up in the customary manner, and has a tread section 1, side walls 2, and tire beads 3 in which are disposed bead cores 4. A non-illustrated carcass is anchored in the beads 3 by being looped around the bead cores 4, and a pull-resistant belt is disposed radially outwardly of the carcass.

In order to facilitate introduction of one-piece shaped rings 5 for molding, which rings are preferably made of steel, it is expedient, though not mandatory, to fold or displace the tire beads 3 and the side walls 2 of the tire blank laterally outwardly. The shaped molding rings 5, which are advantageously held in place by a holding device 6, are moved individually or together toward the tire blank and essentially at right angles thereto. Accompanied by a slight oval deformation of one of the tire beads 3, the ring or rings 5 are then introduced into the interior of the tire blank, where they are rotated by about 90°, so that the axes of the rings 5 and of the tire blank extend parallel to one another. If necessary, the shaped molding rings 5 can also be made of a different heat-conducting material, such as aluminum.

Figure 2:
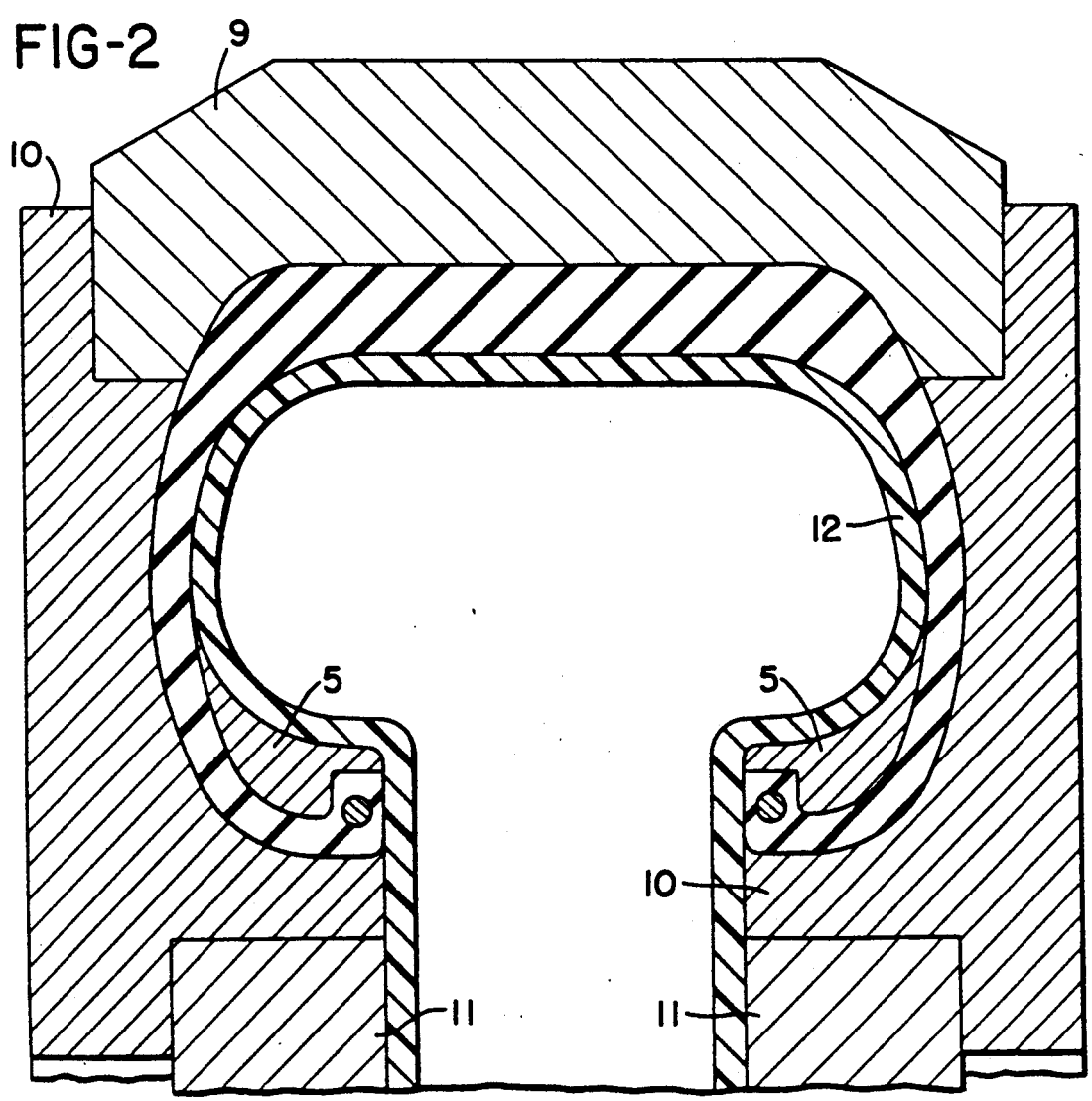
FIG. 2 is a view that shows a schematic partial radial section of one inventive embodiment of a vulcanizing apparatus into which has been placed a tire blank.

The side walls 2 and the tire beads 3 of the tire blank are subsequently again folded inwardly. So that the subsequent sealing surfaces 7 on the tire bead 3 can assume a position on the corresponding shaped molding surfaces 8 of the rings 5 (transition from FIG. 1 to FIG. 2), it is again necessary to slightly ovally deform the pertaining tire bead 3, push the latter through the associated ring 5, and then pull the bead 3 back onto the shaped molding surfaces 8. The contour and position of the tire beads 3 is thereupon essentially identical with that of the tire when it is subsequently mounted on a rim, because in the region of the shaped molding surfaces 8, the rings 5 essentially coincide with the corresponding parts (seating surfaces on the rim ring and on the rim flange) of the rim which is to be used, so that the inner diameter of the shaped molding rings 5 is less than or the same as the central diameter of the core rings in the tire beads 3.

After the shaped molding rings 5 have been installed, the tire blank is placed in a vulcanizing apparatus (FIG. 2), with it being necessary to remove the holding device 6 in a timely manner. The vulcanizing apparatus is provided with segments 9 that are distributed over the periphery of the tire, and are radially movable in a customary manner; adjacent to the segments 9 are axially movable side sections 10. Disposed radially inwardly there are further mold parts 11 to which an expandable bellows-like bag 12 is attached. The bag 12 can be inflated with a heating medium, such as steam, and during the vulcanization presses the shaped molding rings 5 against those sealing surfaces 7 of the inner wall of the tire which are to be shaped or molded.

After the vulcanization, the tire is removed in the customary manner from the vulcanizing mold. Immediately thereafter the shaped molding rings 5 are removed and are introduced into the next tire blank, so that they do not cool off.

If necessary, the previously described method can be varied to the extent that the shaped molding rings 5 are inserted already during wrapping of the tire onto the drum. This avoids a separate operation or procedure.

The present invention is, of course, in no way restricted to the specific disclosure of the specification and drawing, but also encompasses any modifications within the scope of the appended claims.

What we claim is:

1. A method of vulcanizing a pneumatic vehicle tire having a bead region with a carcass having sidewalls with beads that include bead cores and that in the mounted state are disposed specifically on seating surfaces of an inner periphery of a rim so that tire bead seating surfaces which provide for an airtight mounting of the tire beads on the rim are disposed with the tire specifically in sealing regions of the tire beads, the method comprising the steps of:
   ovally deforming one of the tire beads and introducing crescent-arcuate shaped molding rings with a right angle step recess into the interior of the carcass by rotating the rings;
   vulcanizing said tire with its beads in an operating position thereof so that all detrimental distortions of the tire contour with respect to the operating position thereof are avoided; and
   accurately and smoothly shaping said rim seating surfaces of said tire beads during said vulcanization with the aid of said molding rings arranged paired outwardly of each tire bead so that said rim seating surfaces have a contour including a right angle step recess with respect to seating surfaces of the inner periphery of the rim, the molding rings being fitted between the tire and expandable bellows-like bag means so that the crescent-arcuate shaped undercut molding surfaces and the right angle step recess of the rings accurately shape bead rim seating portions of the tire, whereby the tire is vulcanized with its beads in the operating position thereof and in such a way that the tire can be mounted sealingly on a rim without permanent stress or deformation.

2. A method according to claim 1, which includes the step of using steel molding rings of a good heat-conducting material.

3. A method according to claim 2, which includes the step of using steel molding rings.

4. A method according to claim 1, which includes the step of placing said shaped molding rings into a tire blank immediately prior to said vulcanizing step.

5. A method according to claim 1, which includes the step of introducing said shaped molding rings during build-up of a tire blank.

6. An apparatus for vulcanizing a pneumatic vehicle tire having a bead region with a carcass having sidewalls with beads that include bead cores and that in the mounted state are disposed on an inner periphery of a rim so that tire bead seating surfaces which provide for an airtight mounting of the tire beads on the rim are disposed with the tire specifically in sealing regions of the tire beads, said apparatus comprising:
   segment means located peripherally and radially of the tire;
   laterally located movable side sections complementary to said segment means to form a vulcanizing mold which delimits the exterior of the tire being vulcanized;
   an expandable bellows-like bag to delimit the interior of the tire being vulcanized; and
   two metallic, one-piece, crescent-arcuate shaped molding rings arranged paired outwardly of each tire bead, each of which one-piece molding rings including a right angle step recess at a curved inner end, the molding rings being fitted between the tire and the expandable bellows-like bag so that the crescent-arcuate shaped undercut molding surfaces and right angle step recess of the rings accurately shape right angle step bead rim seating portions of the tire so that the tire is vulcanized with its beads in the operating position thereof and in such a way that the tire can be mounted on a rim without permanent stress or deformation.

* * * * *